US008432848B2

(12) United States Patent
Mehta et al.

(10) Patent No.: US 8,432,848 B2
(45) Date of Patent: Apr. 30, 2013

(54) QUEUED COOPERATIVE WIRELESS NETWORKS CONFIGURATION USING RATELESS CODES

(75) Inventors: Neelesh B. Mehta, Bangalore (IN); Vinod Sharma, Bangalore (IN); Gaurav Bansal, Bangalore (IN)

(73) Assignee: Indian Institute of Science (IISC), Karnataka (IN)

( * ) Notice: Subject to any disclaimer, the term of this patent is extended or adjusted under 35 U.S.C. 154(b) by 470 days.

(21) Appl. No.: 12/550,177

(22) Filed: Aug. 28, 2009

(65) Prior Publication Data
US 2010/0296432 A1 Nov. 25, 2010

(30) Foreign Application Priority Data

May 21, 2009 (IN) .......................... 1169/CHE/2009

(51) Int. Cl.
H04B 7/14 (2006.01)
(52) U.S. Cl.
USPC ............................ 370/315; 370/328; 370/429
(58) Field of Classification Search ........................ None
See application file for complete search history.

(56) References Cited

U.S. PATENT DOCUMENTS

| 4,716,575 | A | * | 12/1987 | Douros et al. | 375/212 |
| 6,006,289 | A | * | 12/1999 | James et al. | 710/35 |
| 6,091,710 | A | * | 7/2000 | Mawhinney | 370/236 |
| 2002/0143939 | A1 | * | 10/2002 | Riddle et al. | 709/224 |
| 2007/0133691 | A1 | * | 6/2007 | Kozat | 375/240.24 |
| 2007/0217432 | A1 | * | 9/2007 | Molisch et al. | 370/400 |
| 2008/0080475 | A1 | * | 4/2008 | Orth et al. | 370/350 |
| 2008/0317017 | A1 | * | 12/2008 | Wiemann et al. | 370/389 |

OTHER PUBLICATIONS

Stefanov, et al., "Cooperative Coding for Wireless Networks", IEEE Transactions on Communications, vol. 52, No. 9, Sep. 2004, pp. 1470-1476.
Nosratinia, et al., "Cooperative Communication in Wireless Networks", IEEE Communications Magazine, Oct. 2004, pp. 74-80.
Nabar, et al., "Fading Relay Channels: Performance Limits and Space-Time Signal Design", IEEE Journal on Selected Areas in Communications, vol. 22, No. 6, Aug. 2004, pp. 1099-1109.
Maric, et al., "Cooperative Multihop Broadcast for Wireless Network", IEEE Journal on Selected Areas in Communications, vol. 22, N. 6, Aug. 2004, pp. 1080-1088.
Bletsas, et al., "A Simple Cooperative Diversity Method Based on Network Path Selection", IEEE Journal on Selected Areas in Communications, vol. 24, No. 3, Mar. 2006, pp. 659-672.
International Search Report and Written Opinion prepared by the Australian Patent Office in PCT/IB2010/001131 mailed Oct. 1, 2010.

(Continued)

Primary Examiner — Jason Mattis
Assistant Examiner — James P Duffy
(74) Attorney, Agent, or Firm — Brundidge & Stanger, P.C.

(57) ABSTRACT

A system using cooperative communication with rateless codes is presented that uses communication transmission aspects of cooperative communication with rateless codes over Rayleigh fading channels and queuing aspects for buffering messages at intermediate relays. The system transmits a subsequent message while a current message is en route to the destination by receiving and buffering the current message in queues at intermediate relays. A relay with a best instantaneous communication link to the source may receive a message first and forward the received message to the destination. Alternatively, if inter-relay communication links are strong, all relays may cooperate simultaneously.

21 Claims, 9 Drawing Sheets

OTHER PUBLICATIONS

Castura et al., "Rateless Coding for Wireless Relay Channels", IEEE Transactions on Wireless Communications, vol. 6, No. 5, May 2007, pp. 1638-1642.

Castura, J. And Mao, Y., "Rateless coding for wireless relay channels," in International Symposium on Information Theory, 2005, pp: 810-814.

Eckford, A., et al., "Low-Complexity Cooperative Coding for Sensor Networks using Rateless and LDGM Codes," IEEE International Conference on Communications, vol. 4, pp. 1537-1542 (2006).

Krämer, W. And Lagenbach-Belz, M., "Approximate formulae for the delay in the queueing system Gi/Gi/1," in Proc. 8th Intl. Teletraffic Congress, pp. 235-248 (1976).

Mackay, D. J. C., "Fountain codes," IEEE Proceedings Communication, vol. 152, Issue 6, pp. 1062-1068 (2005).

Mehta, N. B., et al., "Queued Cooperative Wireless Networks With Rateless Codes," IEEE Global Telecommunications Conference, pp. 1-6 (2008).

Mitzenmacher, M., "Digital Fountains: A Survey and Look Forward," IEEE Information Theory Workshop, pp. 271-276 (2004).

Molisch, A. F., et al., "Performance of Fountain Codes in Collaborative Relay Networks," IEEE Transactions on Wireless Communication, vol. 6, Issue: 11, pp: 4108-4119, Mitsubishi Electric Research Laboratories, Inc. (2007).

Palanki, R. And Yedidia, J.S., "Rateless codes on noisy channels," International Symposium on Information Theory, pp. 38 (2004).

Shokrollahi, A., "Raptor Codes," IEEE International Symposium on Information Theory, vol. 52, Issue 6, pp. 36 (2004).

\* cited by examiner

THROUGHPUT AND STABILITY REGION FOR BEST RELAY SELECTION FOR DIFFERENT NUMBERS OF RELAYS, ROUND-ROBIN / PROBABILISTIC SELECTION, AND STRONG INTER-RELAY LINKS. THE SHORT VERTICAL MARKS INDICATE THE STABILITY REGION BOUNDARY.

MEAN END-TO-END TIME IN NETWORK VS. THROUGHPUT FOR TRADITIONAL QUEUED WIRELESS NETWORKS FOR DIFFERENT NUMBERS OF RELAYS

END-TO-END TIME IN NETWORK FOR M = 3 RELAYS

END-TO-END TIME IN NETWORK VS. THROUGHPUT FOR M = 3 RELAYS

QUEUED COOPERATIVE WIRELESS NETWORKS CONFIGURATION USING RATELESS CODES

CROSS-REFERENCE TO RELATED APPLICATION

The present application claims priority under 35 U.S.C. §119(d) to a corresponding patent application filed in India and having application number 1169/CHE/2009, filed on May 21, 2009, the entire contents of which are herein incorporated by reference.

BACKGROUND

Cooperative communications, where different nodes in a network work together to transmit information from a source to a destination, decreases energy expenditure and improves reliability of data transmission in a wireless network. A variety of cooperation schemes have been proposed, such as cooperative beam-forming, distributed space-time codes, amplify and forward signaling, decode and forward signaling, dynamic decode and forward signaling, etc.

Fountain codes, and, in general, rateless codes have recently been shown to be well suited for cooperative relay networks. Rateless code transmission techniques produce encoded symbols of information, such as encoded bits, bytes, or packets, of information. A rateless code is used to transform an original message of n blocks into a message with more than n blocks, such that the original message can be recovered from a subset of the transformed blocks. A fraction of the blocks that are required to recover the message is referred to as the rate, denoted r.

Unlike conventional codes, which generate a finite number of parity bits or blocks, rateless codes generate an infinite number of parity bits or blocks that are transmitted until an acknowledgment is received from a recipient that indicates that the recipient has received enough blocks to recover the original message. Because rateless codes take a finite amount of original information and produce a practically infinite number of encoded blocks for transmission to one or more users, there is no concept of rate or a fixed number of encoded blocks.

With rateless codes, a receiver may recover original information from unordered subsets of one or more rateless code-streams transmitted by multiple sources so long as the total mutual information accumulated marginally exceeds the entropy of the source information, for example. Generally, using rateless codes, a potentially limitless sequence of encoding symbols can be generated from a given set of source symbols, and the original source symbols can be recovered from any subset of the encoded symbols of size equal to or slightly larger than the number of source symbols.

Using rateless coding, encoded symbols may be lost in transmission, however, original information can still be recovered because of redundant transmission of encoded information. Thus, rateless coding is considered a form of error/erasure correction coding because of an ability to preserve information in the presence of losses.

SUMMARY

The present application describes a method of transmitting information between a source and a destination using an intermediate relay. The method includes multiple intermediate relays receiving from the source via a first communication channel blocks of a given message encoded using a first rateless code, and each intermediate relay buffering received blocks of the given message in the intermediate relay for storage and subsequent delivery to the destination. The method also includes upon a first intermediate relay determining that enough blocks of the given message have been received to decode the given message, the first intermediate relay (i) transmitting an acknowledgement message indicating to the source to discontinue transmission of the blocks of the given message and indicating to the other intermediate relays that the first intermediate relay has completed reception of the given message, and (ii) placing the given message into a queue of the first intermediate relay. The method further includes the other intermediate relays emptying a buffer including buffered received blocks of the given message, and the first intermediate relay repeatedly transmitting blocks of the given message stored in the queue of the first intermediate relay encoded using a second rateless code to the destination via a second communication channel until an acknowledgment is received from the destination indicating that the destination has received enough blocks to decode the given message.

In another aspect, the present application describes a computer-readable medium containing a set of instructions for causing a processing unit to perform the functions of receiving from a source via a first communication channel blocks of a given message encoded using a first rateless code, buffering received blocks of the given message for storage and subsequent delivery to a destination, and determining that enough blocks of the given message have been received to decode the given message. The functions further include transmitting an acknowledgement message indicating to the source to discontinue transmission of the blocks of the given message and indicating to relays to empty a buffer including buffered received blocks of the given message, placing the given message into a queue for delivery to the destination, and repeatedly transmitting blocks of the given message stored in the queue encoded using a second rateless code to the destination via a second communication channel until an acknowledgment is received from the destination indicating that the destination has received enough blocks to decode the given message.

In still another aspect, the present application describes a relay including a wireless reception unit for receiving blocks of messages encoded using a first rateless code via a wireless communication channel, and for receiving messages transmitted by other relays. The relay also includes a rateless decoding unit for receiving the blocks of the messages and decoding the messages, and a queue for storing the blocks of the messages. Upon receiving a message from another relay indicating that the other relay has decoded a given message prior to the relay, the queue empties a buffer of stored blocks of the given message. The relay further includes a rateless encoding unit to encode received messages using a second rateless code, and a radio transmission unit for transmitting a message indicating that the relay has decoded the message, and for transmitting blocks of received messages encoded using the second rateless code.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
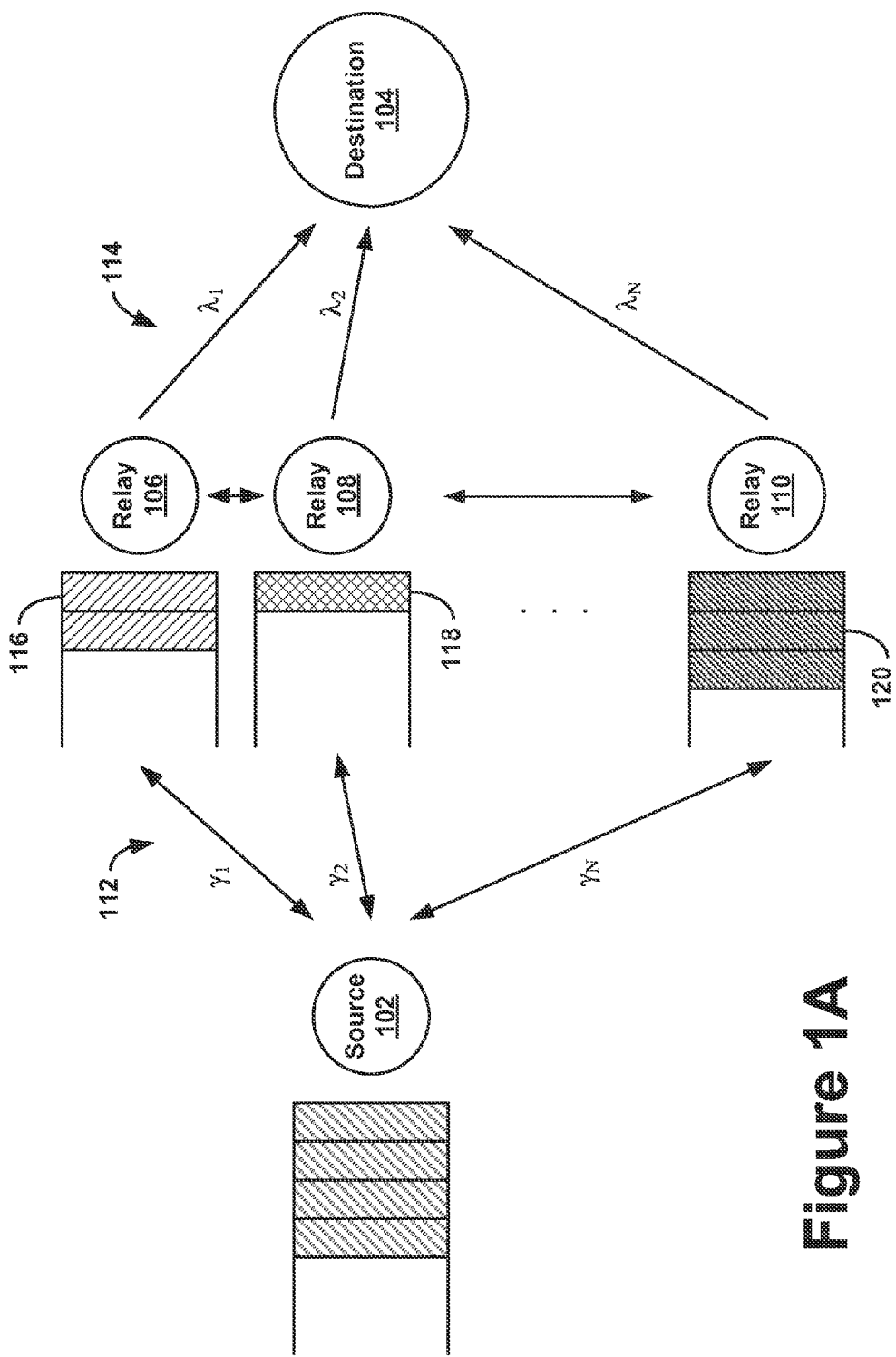
FIG. 1A is a block diagram illustrating an example of a two-hop network in which a source has a continuous stream of messages to transmit to a destination via decode-and-forward intermediate relays.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In the present application, a system using cooperative communication with rateless codes is presented. In one example, a queued cooperative relay system is described that combines communication transmission aspects of cooperative communication using rateless codes over Rayleigh fading channels with queuing aspects associated with buffering messages at intermediate relays. Relay cooperation communication can reduce message transmission times, which increases throughput, and also helps to distribute traffic load in a network, which reduces transit times. Thus, queuing in a cooperative network can improve throughput compared with traditional systems in which a source transmits a subsequent message only after a current message has been received by the destination.

The present application describes a system that enables the source to start transmitting a subsequent message, while the current message one is en route to the destination by receiving and buffering the current message in queues at intermediate relays. Such queues can be employed in full-duplex relays, which can transmit and receive simultaneously, and also in half-duplex relays.

Within example embodiments, the performance of the system can be determined in terms of average throughput, stability region of the queues in the network, and an average end-to-end transmission time of a message using many example cooperation communication techniques. Each example cooperation communication technique may provide different stability (e.g., retention or loss of data packets), delay, and throughput trade-offs. For example, one described technique includes relay selection diversity, in which a relay with a best instantaneous communication link to the source receives a message first and forwards the received message to the destination. Another example technique includes relay cooperation with strong inter-relay communication links, in which all the relays cooperate simultaneously. Still, other examples include a round robin relay selection method and a probabilistic relay selection method.

In addition, within example embodiments, a timeout mechanism is provided for nodes that transmit rateless codes. The timeout mechanism helps ensure stability of the queues at the relays, for example, when wireless communication links between the source and relays or between the relays and the destination undergo Rayleigh fading.

Referring now to the figures, FIG. 1A is a block diagram illustrating a two-hop network in which a source 102 has a continuous stream of messages to transmit to a destination 104 via decode-and-forward intermediate relays 106, 108, and 110. The network is illustrated with three intermediate relays, however, more or fewer relays may be included.

Each message may have a payload of B bits. The payload may also be expressed in bandwidth normalized terms in nats/Hz, for example. A message transmitted by the source 102 is received by multiple relays due to the broadcast nature of a wireless channel 112 between the source 102 and the intermediate relays 106, 108, and 110.

The source 102 as well as the intermediate relays 106, 108, and 110 use rateless codes to transmit messages, and each may use a different rateless code. A rateless code is a mathematical transformation that takes a number of original blocks, $A(1), \ldots, A(K)$, and produces a stream of coded blocks, such as $B(1), B(2), \ldots, B(N), B(N+1), \ldots$. To do so, an underlying rateless code operation is used to produce such coded blocks. There are many techniques or examples of rateless operations. One such example includes dividing an original message of K blocks into N blocks, where N>K. A linear function can then be constructed, and the N blocks can be encoded using the linear function. A receiver will have knowledge of the linear function, and will process received blocks to solve for the original message.

As a specific example of encoding using a rateless code, if an original message includes 1 block, using rateless coding, multiple blocks are generated from the message by taking, for example, different pseudo random linear combinations of the bits in the original message block. The blocks of information can be encoded using the function and transmitted to a receiver that has knowledge of the function and will receive the encoded blocks of information, and be able to recover the original message by solving a linear set of equations using the received blocks of information.

The source 102 and the intermediate relays 106, 108, and 110 will encode messages using a rateless code, and will transmit the encoded blocks. Copies of the encoded blocks will be repeatedly transmitted until a receiver indicates that the receiver has received enough blocks to be able to decode and recover the original message. The encoded blocks will be continually transmitted, and eventually the receiver will successfully receive enough blocks so as to decode the original message. For example, the source 102 will encode a message with a rateless code, and transmit the encoded blocks. Each of the intermediate relays 106, 108 and 110 will receive the encoded blocks. However, based on the wireless channel 112, one of the intermediate relays 106, 108 and 110 may receive more blocks or may receive all of the encoded blocks more quickly than another of the intermediate relays 106, 108 and 110. Once one of the intermediate relays, such as intermediate relay 106 for example, has received all or enough of the encoded blocks so as to decode and recover the original message, the intermediate relay 106 will transmit an acknowledgement message, which will be received by the source 102 and the other intermediate relays 108 and 110. The source 102 will receive the acknowledgement message, stop transmitting the encoded blocks of the current message, and then begin transmitting encoded blocks of a subsequent message. The other intermediate relays 108 and 110 will receive the acknowledgement message and will then disregard all the received blocks pertaining to the current message.

In the network illustrated in FIG. 1A, the source 102 transmits messages to the destination 104 via the intermediate relays 106, 108, and 110. The source 102 transmits a message (or blocks of a message encoded using a rateless code), and multiple relays will receive the message. The relay with a best communication link to the source 102 will receive enough blocks and decode the message first. This relay can then re-encode the message and transmit the message to the destination 104 via a wireless channel 114.

Each intermediate relay 106, 108 and 110 includes a buffer (such as buffers 116, 118 and 120) to store blocks of messages that are received. If the wireless channel 112 is better than the wireless channel 114 in terms of low presence of interfering signals and/or high signal-to-noise ratios, the intermediate relays 106, 108 and 110 will receive messages faster than the intermediate relays 106, 108 and 110 can transmit the messages to the destination 114. Thus, the intermediate relays 106, 108 and 110 can buffer messages in a queue and transmit messages in the order received, while still receiving messages from the source 102. Once the wireless channel 114 improves, such as by less wireless traffic being transmitted over the channel and/or a signal-to-noise ratio increasing, the intermediate relays 106, 108 and 110 can empty the buffers 116, 118 and 120 by successfully transmitting the messages to the destination 104.

As mentioned, once one of the intermediate relays, such as the intermediate relay 106 for example, receives all or enough of the encoded blocks so as to decode and recover the original message, the intermediate relay 106 will transmit an acknowledgement message, which will be received by the source 102 and the other intermediate relays 108 and 110. The other intermediate relays 108 and 110 will receive the acknowledgement message and will then disregard all the received blocks pertaining to the current message, and thus, may empty respective buffers 118 and 120 that stored received blocks of the current message. Thus, each relay in the network illustrated in Figure 1A may communicate with each other (in addition to communicating with the source 102 and destination 104) as shown by the double-sided arrows between the relays 106, 108, and 110. Enabling communication between the relays 106, 108 and 110 allows each individual relay to provide instructions to the other relays indicating when to disregard blocks of messages received from the source 102.

Figure 1B:
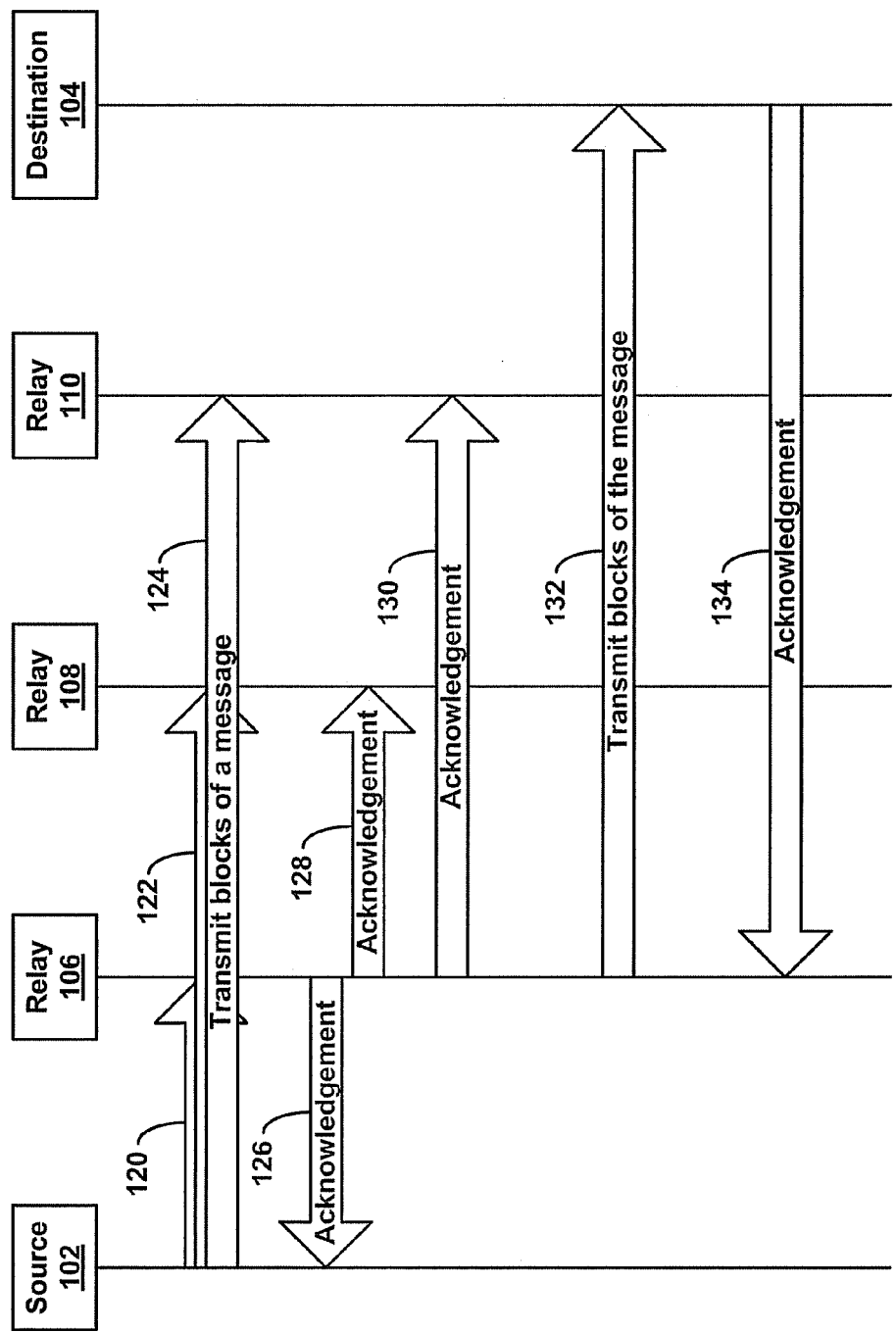
FIG. 1B is a message diagram illustrating an example of communicating messages between entities within the network shown in FIG. 1A.

FIG. 1B is a message diagram illustrating an example of communicating messages between entities within the network shown in FIG. 1A. As shown, initially, the source 102 will transmit blocks of a message to relays 106, 108 and 110, as shown by arrows 120, 122 and 124. The source 102 may broadcast wireless signals including data representing the blocks of the message, which will be received by each of relay 106, 108 and 110, respectively. Alternatively, the source 102 may transmit individual signals directed to each of the relays 106, 108, and 110 so that each relay only receives wireless signals directed to the relay.

Subsequently, once one of the relays receives enough blocks so as to decode the full message, the relay, such as relay 106 for example, will broadcast a wireless signal including data representing an acknowledgement to the source 102, and to the other relays 108 and 110, as shown by arrows 126, 128, and 130. Alternatively, the relay 106 may transmit individual wireless acknowledgement signals to each of the source 102 and the other relays 108 and 110. By broadcasting or transmitting signals to the other relays 108 and 110, the relay 106 provides instructions to the other relays 108 and 110 which may include to delete or disregard all blocks of the message that were received from the source 102, for example, since the relay 106 was the first to fully receive the message and may handle transmission of the message to the destination 104. Alternatively, the acknowledgement message may include instructions for other actions as well, such as instructing the relays 108 and 110 to continue to attempt to decode the messages by receiving blocks of the message transmitting by the relay 106 to the destination 104, for example.

The relay 106 will then re-encode the fully received message with a rateless code and transmit blocks of the re-encoded message to the destination 104, as shown by arrow 132. Once the destination 104 has received enough blocks of the message to fully decode the message, the destination 104 will transmit an acknowledgement message to the relay 106, as shown by arrow 134.

Using the intermediate relays 106, 108 and 110 enables the source 102 to transmit more messages and/or transmit messages at a higher rate, and thus increases throughput of the system. For example, without the intermediate relays 106, 108 and 110, the source 102 would transmit directly to the destination 104, and as a link between the source 102 and the destination 104 varies due to fading, for example, messages may be lost or transmitted at a slower rate. However, using the intermediate relays 106, 108, and 110, if a communication link between the source 102 and one of the intermediate relays 106, 108, and 110 is poor due to low signal-to-noise ratios and/or large amounts of interference, there are still two other links through which messages may be transmitted.

Figure 2:
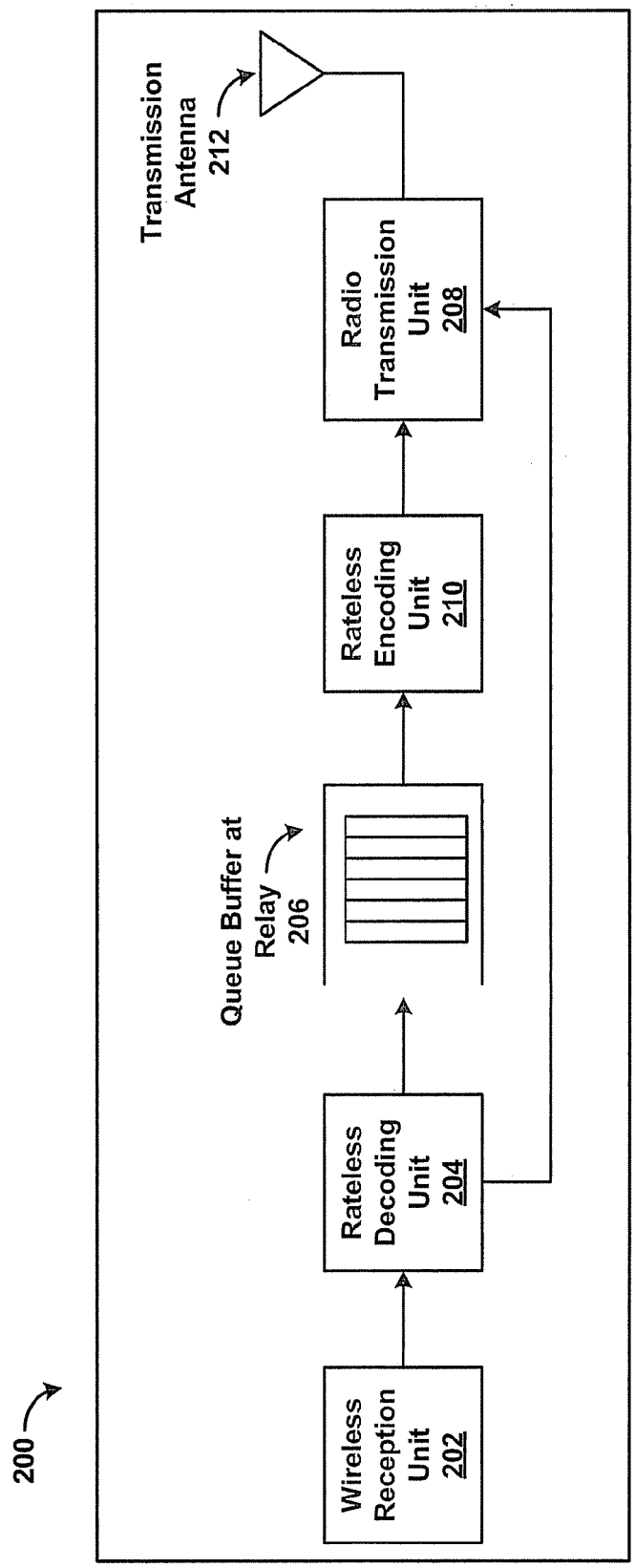
FIG. 2 is a block diagram illustrating an example of a relay.

FIG. 2 is a block diagram illustrating an example of a relay 200. The relay 200 includes a wireless reception unit 202 that receives messages via a wireless communication channel and sends the messages to a rateless decoding unit 204. The rateless decoding unit 204 decodes blocks of messages using a given rateless code, and stores a decoded message in a queue buffer 206. The queue buffer 206 may also store received blocks of a message that are encoded using a rateless code. Once the rateless decoding unit 204 has successfully decoded the message using a sufficient number of received blocks of the message, the rateless decoding unit 204 may inform a radio transmission unit 208 to transmit a message indicating that the relay 200 has decoded the message.

The relay 200 also includes a rateless encoding unit 210 to encode received messages with a second rateless code so as to transmit the encoded messages to a destination. The radio transmission unit 208 may transmit encoded messages to a destination using an antenna 212.

The wireless reception unit 202 further may receive messages from other relays, such as an acknowledgement message indicating that another relay has received enough blocks of the current message being transmitted by a source to decode the source. If the acknowledgement message is received by the relay 200 before the relay 200 has received enough blocks of the current message being transmitted by the source to decode the source, then the relay 200 concludes that another relay has decoded the message. The relay 200 may then disregard or delete all received and stored blocks of the message that were within the buffer 206. Alternatively, the relay 200 may also receive transmissions from the other relay that sent the acknowledgment message and that are directed to the destination, and can decode the current message being transmitted as well. In this manner, the relay 200 will work to transmit the message to a destination along with the other relay. It may be assumed that the relays are configured to be in a cooperative relay network, so that each relay cooperates with each other to transmit data to the destination. Note that in the alternative example, none of the relays delete any portion of the current message that has been received after receiving an acknowledgement from a given relay. Instead, the relays continue to decode the current message by receiving blocks that are retransmitted from a given relay, and then, together transmit the message to the destination.

Figure 3:
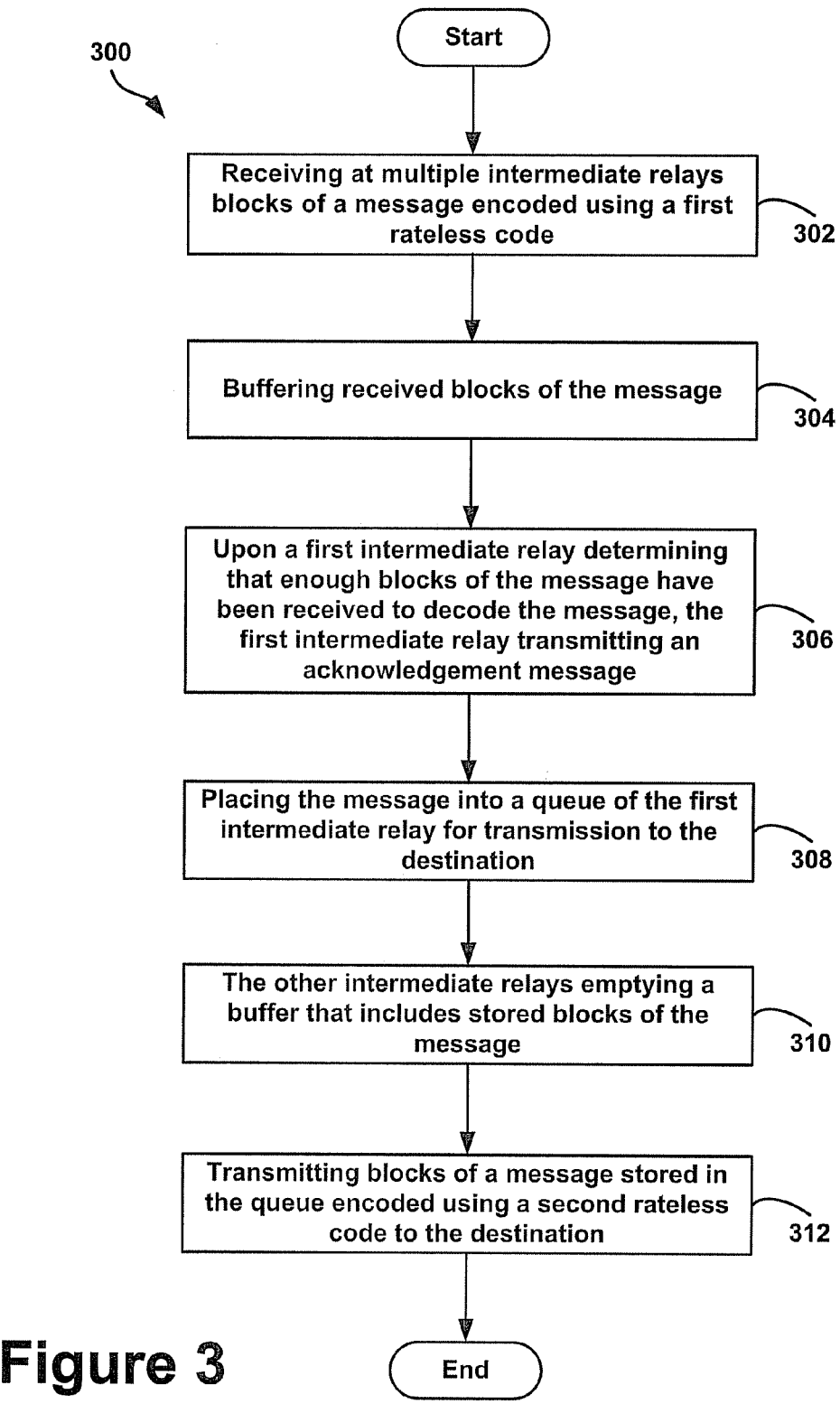
FIG. 3 is a flowchart depicting example steps of a method for transmitting information between a source and a destination using an intermediate relay.

FIG. 3 is a flowchart depicting example steps of a method for transmitting information between a source and a destination using an intermediate relay. It should be understood that the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those reasonably skilled in the art.

The method includes initially receiving at multiple intermediate relays blocks of a given message encoded using a first rateless code, as shown at block 302. The blocks of the message are transmitted by the source and sent via a first communication channel. Each intermediate relay that receives blocks will buffer received blocks in storage, as shown at block 304.

Upon a first intermediate relay determining that enough blocks of the message have been received to decode the message, the first intermediate relay will transmit an acknowledgement message indicating to the source to discontinue transmission of the blocks of the message and indicating to the other intermediate relays that the first intermediate relay has completed reception of the given message, as shown at block 306.

A relay may determine that enough blocks of the message have been received to decode the message using many techniques. For example, the blocks may include an embedded cyclic redundancy check (CRC) in the blocks. The relay may simply continue to try to decode the message by attempting to solve a set of linear equations according to a given rateless code function being used, and if the relay fails, as will be indicated by the failure of the CRC parity check conditions, the relay waits for more blocks to be received.

The first intermediate relay will also place the message into a queue of the first intermediate relay for transmission to the destination, as shown at block 308. After receiving the acknowledgement message from the first intermediate relays, the other intermediate relays will empty a buffer that includes stored received blocks of the message, as shown at block 310. Thus, if an intermediate relay did not receive enough blocks to decode the message, the intermediate relay will delete or erase all blocks of the message that were received.

Subsequently, the intermediate relays will repeatedly transmit blocks of a message stored in a queue of the intermediate relay encoded using a second rateless code to the destination via a second communication channel, as shown at block 312. The relays will transmit the blocks of the message until an acknowledgment is received from the destination indicating that the destination has received enough blocks to decode the message. Thus, each relay will transmit messages that the relays have fully received from the source to the destination in the order in which the messages are stored within internal queues, for example.

As mentioned above, when a relay receives a sufficient number of blocks of the message, the relay can successfully decode the message, which is then queued in the relay's buffer for transmission in a first in first out (FIFO) fashion to the destination. A minimum time taken by relay $R_i$ to decode a message from a source S is:

$$(1+\delta)\frac{B}{\log e(1+\gamma_i)} \qquad \text{Equation (1)}$$

where $\gamma_i$ is a receive signal-to-noise ratio (SNR) for an S-$R_i$ communication link, and $\delta$ is an inefficiency of a practical implementation of the rateless code, and B is a number of blocks of the message. The inefficiency constant, $\delta$, may be ignored in this example as the value can be factored into B. Following a Rayleigh fading assumption, $\gamma_i$ and $\lambda_i$ (which denotes a receive SNR for the $R_i$-destination D link), are exponentially distributed.

For a receiver to separate various transmissions, the relays and the source transmit signals using different, a priori assigned, spreading sequences. Further, no wireless channel knowledge may be needed at transmitters.

A transmitting node may "time-out" if no acknowledgment is received within a specified time, $t_{out}$. For example, using rateless codes, a transmitter transmits encoded blocks of a message indefinitely until the transmitter receives an acknowledgement message indicating that a receiver has received enough blocks in order to decode the message. However, in an example embodiment, a transmitter may discontinue transmitting encoded blocks of information after receiving an acknowledgement message or after a time-out period, whichever occurs first.

Thus, the source may impose a timeout period on the reception of the acknowledgement, and may assume that the packet was lost if an acknowledgement is not received during the timeout period. The timeout period can be computed based on expected propagation and processing delays. The relays will acknowledge messages that were successfully received. The relay may silently drop erroneous packets, which may be detected using checksums, for example. The relays may also silently drop duplicate packets, which may be detected using sequence numbers, for example.

A time-out period is useful for transmitting a rateless encoded message over a Rayleigh fading channel since an average transmission time may otherwise be infinite. For example, without a time-out period, an average time to transmit a message is about $$\int_0^\infty \frac{B}{\overline{h}\log(1+h)} \exp(-h/\overline{h})dh \qquad \text{Equation (2)}$$

where $\overline{h}=E[h]$. It can be shown using mathematical bounding arguments that the integral in Equation (2) may be unbounded.

In the event of a time-out, the source can either drop the message from a queue or begin to retransmit the message. Further, each relay may drop any and all received blocks of a message if the relay has not fully received the message (or has not received enough blocks of the message to be able to successfully decode the message) within the time-out period. Alternatively, each relay may store received blocks and wait to receive enough blocks so as to decode the message, or to receive an acknowledgement message from another relay before the relay deletes undecoded blocks of a message.

Many techniques exist for a source to transmit a message using rateless codes. For example, in an asynchronous technique described above, relays help each other by transmitting a message as soon as a relay decodes the message so that other messages stop attempting to decode a message and clear out buffers with stored pieces of the message. Using this technique, the source transmits until any one of the relays decodes the message, and sends an acknowledgement back. The source then starts transmitting the next message. The relay that decoded the message queues the message in a buffer for transmission to the destination, and the other relays play no further role in the transmission of this message. This technique automatically selects a relay with a best instantaneous S-R communication link.

Figure 4:
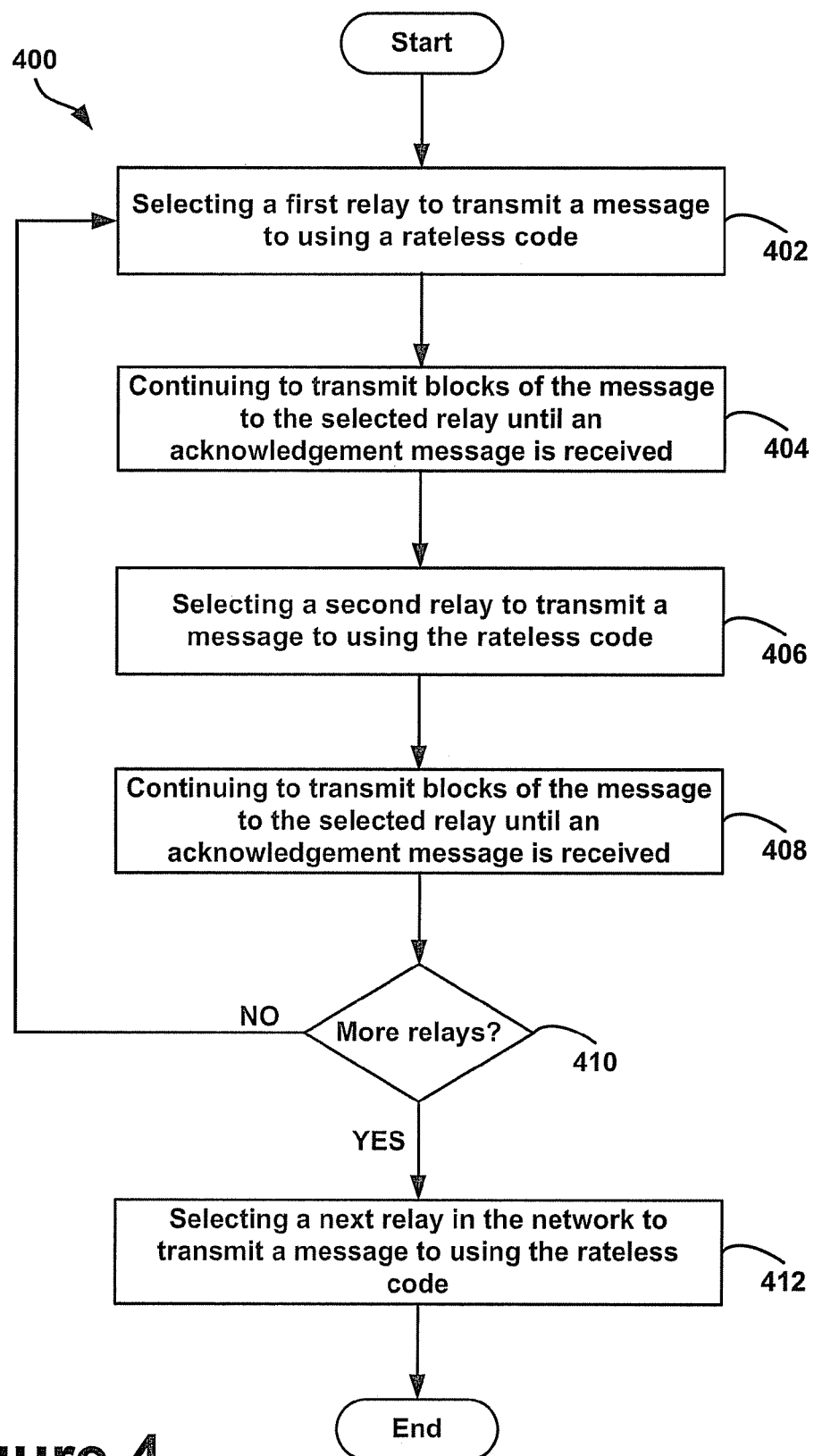
FIG. 4 is a flowchart depicting example steps of another method for transmitting information between a source and a destination using an intermediate relay.

FIG. 4 is a flowchart depicting example steps of another method for transmitting information between a source and a destination using an intermediate relay. The source may select a relay to transmit a message to (using a rateless code) using a round-robin (RR) fashion. Initially, as shown at block 402, the source selects a first relay to send a message. The source will continue to send blocks of the message encoded using a rateless code to the first relay until the first relay replies with an acknowledgement message indicating receipt of the full message, as shown at block 404. Once an acknowledgement is received from the first relay, the source will then transmit a next message to a second relay, as shown at block 406. The source continues to transmit blocks of the next message encoded using the rateless code to the second relay until the second relay replies with an acknowledgement message indicating receipt of the full message, as shown at block 408.

Following, if there are more relays in the network, as shown at block 410, the source will continue to transmit subsequent messages to a next relay in the network, as shown at block 412. If there are no more relays in the network, then the source returns to the first relay and begins transmission of a subsequent message.

Thus, using a round-robin fashion, the source may select relays in a predetermined order and transmit subsequent messages to subsequent relays in order. In this manner, each relay would receive a message once a previous relay sends an acknowledgement back to the source. Once an intended relay decodes the message, the relay sends an acknowledgment back to the source, and the relay stores the message in a queue for transmission to the destination. The source then starts transmitting the next message.

Figure 5:
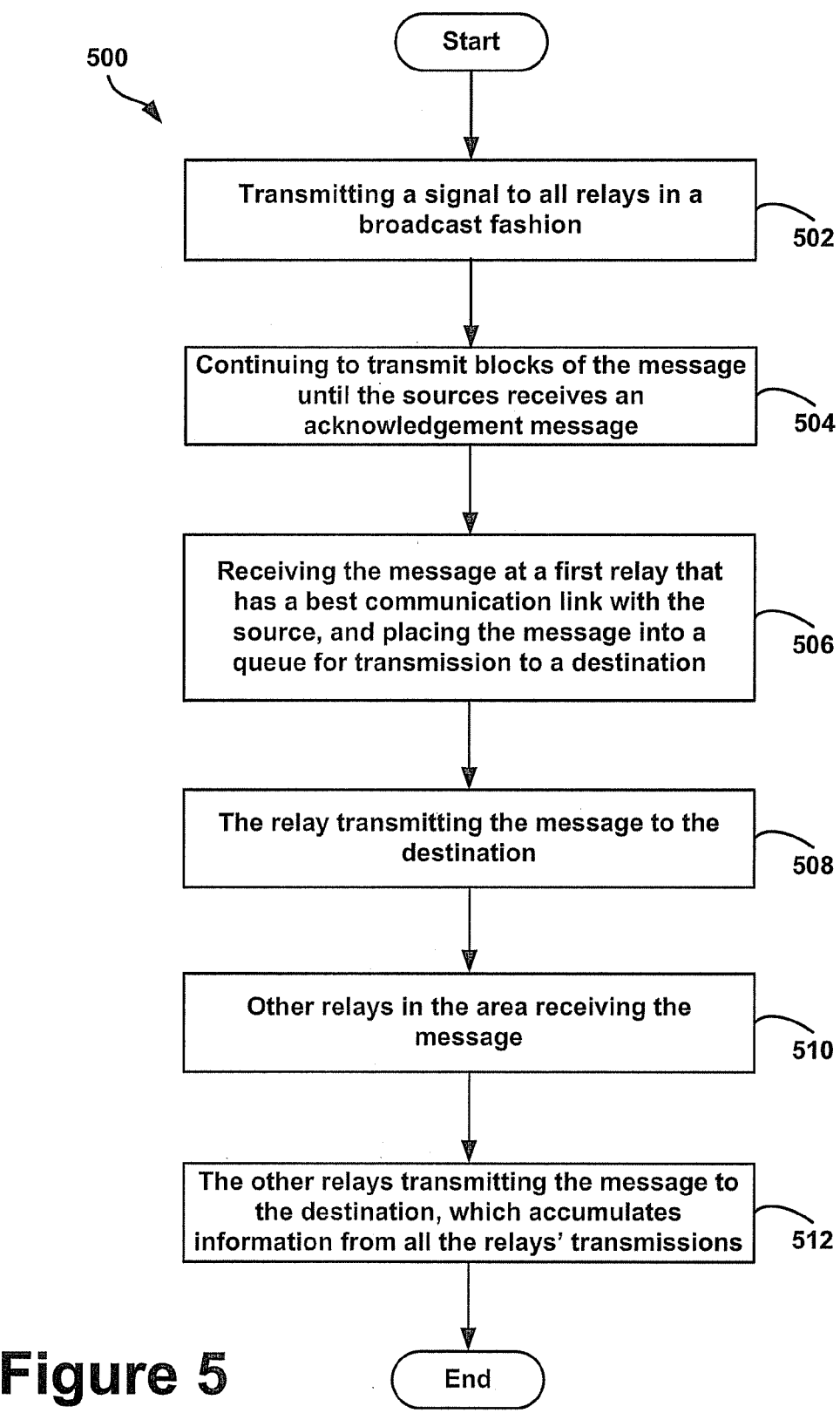
FIG. 5 is a flowchart depicting example steps of still another method for transmitting information between a source and a destination using an intermediate relay.

FIG. 5 is a flowchart depicting example steps of still another method for transmitting information between a source and a destination using an intermediate relay. If inter-relay communication links are strong enough, then all relays may communicate with each other to transmit messages. Thus, initially, as shown at block 502, the source will begin transmitting a signal to all relays in a broadcast fashion, and will continue transmitting blocks of the message until the source receives an acknowledgement. As shown at block 504, a relay that has a best communication link to the source will be the first relay to receive enough blocks of the message to decode the message.

The relay that receives the message first will then send an acknowledgement message to the source, and place the message into a queue for transmission to a destination, as shown at block 506. Then, the relay will begin to transmit the message to the destination, as shown at block 508. If the inter-relay communication links are strong, other relays in the area will receive the message as well, as shown at block 510. The other relays may then also begin transmitting the message to the destination, as shown at block 512. Consequently, all relays may begin transmitting the message to the destination, which can accumulate information from all the relays' transmissions, and decode the message.

Still further, other methods for transmitting information between a source and a destination using an intermediate relay may be used. For example, the source may transmit messages to the relays using load balancing techniques, so that each relay is used approximately equally. As another example, the source may select relays using a probabilistic fashion, so that the source selects a relay that has a best chance of receiving the message or that receives the message in a shortest amount of time based on past results. The source may determine a ranking of relays based on which relays have returned acknowledgement messages in the past that indicate a successful reception of messages, and the source may select relays from the ranking.

Estimates can be determined for a transmission time, and a waiting time for a message to be in a queue prior to being transmitted to the destination for each of the techniques described above. Notation for the estimates will be as follows.

For a random variable Y, Y[k], k=1, 2, ..., will denote an independent identically distributed (i.i.d.) sequence with a distribution of Y. E[.], and Var[.] shall denote an expectation and variance, respectively. A cumulative distribution function (CDF) of Y is denoted by $F_Y(.)$. Let $S^{SR}$ be a time taken to transmit a message from the source (including those that are dropped). Let $S_i^{SR}$ denote a message transmission time given that relay i receives the message. Let $A_i$ denote an inter-arrival time between messages that (successfully) arrive at relay i. Let $S_{nd}^{SR}$ denote the transmission time of a message that is not dropped, i.e., $S_{nd}^{SR}=[S^{SR}|S^{SR}<t_{out}]$. Similarly, $S_i^{RD}$ is the message transmission time by relay i (including messages that are dropped). And, $S_{nd,i}^{RD}$ is a corresponding time given that the message is not dropped by relay i. Relay i's queue is denoted by $Q_i$. A probability that the source times out when transmitting is denoted by $P_{out}^{SR}$. Also, let $X_i^{SR}=1/\log_e(1+\gamma_i)$ and $X_i^{RD}=1/\log_e(1+\lambda_i)$ denote reciprocals of the S-R and R-D transmission rates.

A queue with inter-arrival time of messages given by a random variable A and transmission time per message given by the random variable S is stable (i.e., a queue length and waiting time process have unique proper stationary distributions, and starting from an initial condition, the processes coverage weakly to the stationary distributions) if and only if E[A]>E[S].

Furthermore, an approximate expression for a mean waiting time for a message remaining in the queue waiting to be transmitted is:

$$E[W] \approx \frac{ngE[S](C_S^2 + C_A^2)}{2(1-\eta)} \quad \text{Equation (4)}$$

where $$n = \frac{E[S]}{E[A]},$$

$$C_Y^2 = \frac{\text{Var}[Y]}{E[Y]^2},$$

for a random variable Y. If $C_A^2 < 1$, $$g = \exp\left[\frac{-2(1-\eta)(1-C_A^2)^2}{3\eta(C_A^2 + C_S^2)}\right],$$

else for $C_A^2 \geq 1$, $$g = \exp\left[-[1-\eta]\frac{C_A^2 - 1}{C_A^2 + 4C_S^2}\right].$$

In one example, using the technique above including where the relay with a highest S-R communication link will receive the message first (as shown in FIGS. 3 and 5), if there was no time-out, then a message transmission time equals:

$$F_{S^{SR}}(x) = 1 - \prod_{i=1}^{M} P\left(\log_e(1 + \gamma_i) < \frac{B}{x}\right), \quad \text{Equation (5)}$$

$$= 1 - \left(1 - \exp\left[-\frac{1}{\rho_{SR}}(e^{B/x} - 1)\right]\right)^M, \quad \text{Equation (6)}$$

where $\rho_{SR} = E[\gamma_i]$. Therefore, the probability that the source times out and drops the message can be calculated as:

$$P_{OUT}^{SR} = \left(1 - \exp\left[-\frac{1}{\rho_{SR}}(e^{B/t_{out}} - 1)\right]\right)^M \quad \text{Equation (7)}$$

From Equation (6), it can be also shown that for $0 \leq x < t_{out}$, $$\rho_{S_{nd}^{SR}}(x) = \frac{1}{1 - P_{out}^{SR}} \frac{BM}{\rho_{SR} x^2} \times$$
$$\sum_{k=0}^{M-1} (-1)^k \binom{M-1}{k} \exp\left[\frac{B}{x} - \frac{k+1}{\rho_{SR}}(e^{B/x} - 1)\right], \quad \text{Equation (8)}$$

with $$\rho_{S_{nd}^{SR}}(x) = 0, \quad \text{for } x \geq t_{out}.$$

In addition, an inter-arrival time at a first relay, $R_I$, with a message dropping can be written as:

$$A_i = S_{nd,i}^{SR} + \sum_{\substack{j=1 \\ (j \neq 1)}}^{MN_j[1] + N_j[2] + \ldots + N_j[c]} \sum_{k=1} S_j^{SR}[k] + (c-1)t_{out} \quad \text{Equation (9)}$$

where c is a number of cycles between two successful message arrivals in queue, $Q_i$. A cycle is an inter-arrival time between consecutive epochs in which relay i is the best relay, i.e., $X_i^{SR} < X_j^{SR}$, for all $j \neq i$. In an lth cycle, let $N_j[l]$ denote a number of times relay j is the best relay. Then, the lth cycle duration equals $$\sum_{\substack{j=1 \\ (j \neq 1)}}^{M} \sum_{k=1}^{N_j} S_j^{SR} + S_{nd,i}^{SR}$$

if the message is successfully received by relay i at the end of the cycle. Otherwise, $$\sum_{\substack{j=1 \\ (j \neq 1)}}^{M} \sum_{k=1}^{N_j} S_j^{SR} + t_{out},$$

if time-out occurs when $R_i$ is the best relay. Clearly, $P(c) = (P_{out}^{SR})^{c-1} P_{out}^{SR}$, since the source times-out with probability $P_{out}^{SR}$ in the first (c−1) cycles, but not the last one.

A mean inter-arrival time of messages at relay i using the methods shown in FIGS. 3 and 5 is given by:

$$E[A_i] = ME[S_{nd,i}^{SR}] + Mt_{out} \frac{P_{out}^{SR}}{1 - P_{out}^{SR}} \quad \text{Equation (10)}$$

The variance of the inter-arrival time is given by:

$$\text{Var}[A_i] = (t_{out} + (M-1)E[S^{SR}])2\text{Var}[c] + \quad \text{Equation (11)}$$
$$\text{Var}[S_{nd}^{SR}] + (M-1)(M-2)E[S^{SR}]^2 E[c^2] +$$
$$(M-1)E[c](E[S^{SR}]^2 + E[S^{SR}]^2)$$

The constitute terms, $E[A_i]$ and $E[A_i^2]$, in Equation (11) can be evaluated as well. From Equation (8), it can be shown for m=1, 2 that:

$$E[(S_{nd}^{SR})^m] = \quad \text{Equation (12)}$$
$$\frac{1}{1 - P_{out}^{SR}} \frac{B^n M}{\rho_{SR}} \sum_{k=0}^{M-1} (-1)^k \binom{M-1}{k} \psi_m\left(\frac{\rho_{SR}}{k+1}, \frac{B}{t_{out}}\right)$$

where, a>0, u>0 and m≧1, $$\psi_m(a, u) = \int_u^\infty \frac{1}{x^m} \exp\left(x + \frac{1 - e^x}{a}\right) dx.$$

Furthermore, it can be shown for m=1, 2 that $$E[(S^{SR})^m] = (1 - P_{out}^{SR})E[(S_{nd}^{SR})^m] + P_{out}^{SR} t_{out}^m \quad \text{Equation (13)}$$

Statistics of message transmission times at relay i are an i.i.d sequence. As for the S-R communication link technique (method shown in FIG. 3), a probability distribution of $S_i^{RD}$ (including messages that get dropped due to time-out) is given by:

$$\rho_{S_{nd,i}^{RD}}(s) = \begin{cases} \frac{B}{\rho_{RD}s^2}\exp\left[\frac{B}{s}-\frac{1}{\rho_{RD}}(e^{B/s}-1)\right], & 0 \le s < t_{out} \\ \delta(s-t_{out}) & s \ge t_{out} \end{cases}$$ Equation (14)

where $\delta(.)$ is the Dirac delta function. The following results follow from Equation (14):

$$P_{out}^{RD} = 1 - \exp\left[-\frac{1}{\rho_{RD}}e^{B/t_{out}-1}\right]$$ Equation (15)

$$E[(S_i^{RD})^m] = P_{out}^{RD}t_{out}^m + \frac{B^m}{\rho_{RD}}\psi_m\left(\rho_{RD},\frac{B}{t_{out}}\right)$$ Equation (16)

Combining the above results with $E[A] > E[S]$ gives the following results. The relay queues in relay selection technique of FIG. 3 are stable if and only if:

$$P_{out}^{RD}t_{out} + \frac{B}{\rho_{RD}}\psi_1\left(\rho_{RD},\frac{B}{t_{out}}\right) < Mt_{out}\frac{P_{out}^{SR}}{1-P_{out}^{SR}} +$$
$$\frac{1}{1-P_{out}^{SR}}\frac{BM^2}{\rho_{SR}}\sum_{k=0}^{M-1}(-1)^k\binom{M-1}{k}\psi_1\left(\frac{\rho_{SR}}{k+1},\frac{B}{t_{out}}\right)$$ Equation (17)

Expressions for the average delay in $Q_i$ are the end-to-end time, which follow by substituting the above results in Equation (4). The throughput of the system can be shown to be:

$$\Lambda = M \frac{1-P_{out}^{RD}}{\max(E[S_i^{RD}], E[A_i])}$$ Equation (18)

where, due to symmetry, i indexes an arbitrary relay. This expression includes a scenario where the relay queues are unstable. The average end-to-end time for a message that reaches the destination is:

$$\epsilon = E[S_{nd,i}^{SR}] + E[W_i] + E[S_{nd,i}^{RD}]$$ Equation (19)

where $W_i$ is the waiting time of a message in $Q_i$, and is evaluated by substituting the above results in Equation (4).

In another example, using the technique above where the source transmits a message to only one selected relay (as shown in FIG. 4), using a probabilistic selection (PS) policy, the source randomly chooses relay i with probability $p_i = 1/M$. Using a round-robin (RR) policy, the source sequentially transmits to all relays one by one.

For both PS and RR, the cumulative distribution function of message transmission time to $R_i$ is $$F_{S^{SR}}(x) = P\left(X_i^{SR} < \frac{x}{B}\right).$$

It follows that the source time-out probability is:

$$P_{out}^{SR} = \exp\left[-\frac{1}{\rho_{SR}}(e^{B/t_{out}}-1)\right]$$ Equation (20)

And, the probability distribution of $S_{nd}^{SR}$ is:

$$P_{S_{nd}^{SR}}(s) = \frac{1}{1-P_{out}^{SR}}\frac{B}{\rho_{SR}s^2}\exp\left[\frac{B}{s}-\frac{1}{\rho_{SR}}(e^{B/s}-1)\right]$$ Equation (21)

In effect, this is similar to Equation (6) with M=1 since the relay is selected without regard to the channel condition.

Statistics of inter-arrival time $A_i$ at $R_i$ for PS is given by:

$$A_i = S_{nd,i}^{SR} + \sum_{\substack{j=1 \\ (j \ne 1)}}^{MN_j[1]+N_j[2]+\ldots+N_j[c]} \sum_{k=1}^{} S_j^{SR}[k] + (c-1)t_{out}$$ Equation (22)

The reasoning for Equation (22) is similar to that for the relay selection technique described above. As before, $P(c) = (P_{out}^{SR})^{c-1}P_{out}^{SR}$, where $P_{out}^{SR}$ is given by (20). Therefore $E[A_i]$ and $Var[A_i]$ follow the same derivation as above, albeit with different parameter values.

Statistics of inter-arrival time $A_i$ at $R_i$ for RR are different from PS because the source transmits to the relays sequentially. It takes the form:

$$A_i = S_{nd,i}^{SR} + \sum_{\substack{j=1 \\ (j \ne 1)}}^{M}\sum_{k=1}^{c} S_j^{SR}[k] + (c-1)t_{out}$$ Equation (23)

This expression is similar to Equation (22), except that each relay is visited exactly once in RR in every cycle, i.e., $N_j[k] = 1, 1 \le k \le c$. While $E[A_i]$ for RR and PS may be the same (and as per (10)), $Var[A_i]$ is different and takes the form:

$$Var[A_i] = Var[S_{nd,i}^{SR}] + (M-1)E[c]Var[S_i^{SR}] + (t_{out} + (M+1)E[S_i^{SR}])^2 Var[c]$$ Equation (24)

The terms that constitute the above expressions can be evaluated as follows. As for relay selection, for both PS and RR:

$$E[(S_{nd}^{SR})^m] = \frac{1}{1-P_{out}^{SR}}\frac{B^m}{\rho_{SR}}\psi_m\left(\rho_{SR},\frac{B}{t_{out}}\right)$$ Equation (25)

The $E[S^{SR}]$ and $E[S^{SR2}]$ expressions then follow using Equation (13).

The probability distribution of the relay transmission time for PS and RR is the same as for the relay selection case. First and second moments are therefore given by Equation (16). The probability, $P_{out}^{RD}$, that the relay times out is given by Equation (15).

The relay queues in round-robin and probabilistic selection are stable if and only if:

$$P_{out}^{RD}t_{out} + \frac{B}{\rho_{RD}}\psi_1\left(\rho_{RD},\frac{B}{t_{out}}\right) <$$
$$Mt_{out}\frac{P_{out}^{SR}}{1-P_{out}^{SR}} + \frac{1}{1-P_{out}^{SR}}\frac{BM}{\rho_{SR}}\psi_1\left(\rho_{SR},\frac{B}{t_{out}}\right)$$ Equation (26)

The average throughput message waiting time in $Q_i$ and end-to-end delay are obtained by substituting the above expressions in Equation (18), Equation (4) and Equation (19), respectively.

In still another example, using the technique above where all M relays receive a message from the source at the same time (or one relay receives the messages, begins transmitting the message to the destination, and all other relays receive the message from the transmitting relay, as shown in FIG. 5), and also start and stop transmitting the message to the destination simultaneously, in effect, the relays together behave as one relay $R_{eq}$, with an equivalent queue $Q_{eq}$.

The message is received by all the relays when any one of them first receives and then transmits the message, which provides the same message transmission time as for the relay selection technique. Therefore, the probability distribution of $S_{eq}^{SR}$, first and second moments, and $P_{out}^{SR}$ are the same as derived above for the relay selection technique.

An inter-arrival time at $Q_{eq}$ now equals:

$$A_{eq} = S_{nd,eq}^{SR} + wt_{out} \qquad \text{Equation (27)}$$

where w is a number of time-outs that occur between two arrivals at $R_{eq}$. Clearly, $P(w=m)=(P_{out}^{SR})^m(1-P_{out}^{SR})$. The expressions for the mean and variance of $A_{eq}$ follow by substituting M=1 in Equation (10) and Equation (11), respectively.

Using this technique, the destination accumulates mutual information from all the relays, and a transmission rate of the equivalent relay is the sum over the transmission rates of M relays. Therefore, $$\frac{1}{S_{eq}^{RD}} = \frac{1}{B}\sum_{i=1}^{M} \log_e(1+\lambda_i)$$

(without provisioning for time-out).

Using variable transformations and characteristic functions, and accounting for time-out, yields:

$$P_{S_{nd,eq}^{RD}}(x) = \frac{B}{2\pi(1-P^{RD})x^2} \qquad \text{Equation (28)}$$

$$\int_{-\infty}^{\infty} \rho_{RD}^{-Mjw} \exp\left(\frac{jwB}{x}\right) \times \Gamma^M\left(1-jw, \frac{1}{\rho_{RD}}\right) dw,$$

$$0 \le x < t_{out}$$

where $\Gamma(.,.)$ is the Incomplete Gamma function. $P_{out}^{RD}$, $E[S_{nd,eq}^{RD}]$, and $E[(S_{nd,eq}^{RD})^2]$ are computed numerically from Equation (28).

Using the above results, the following stability approximations can be made. The relay queues for the strong inter-relay link scenario are stable if and only if:

$$t_{out}\frac{P_{out}^{RD}}{1-P_{out}^{RD}} + E[S_{nd,eq}^{RD}] < t_{out}\frac{P_{out}^{SR}}{1-P_{out}^{SR}} + \qquad \text{Equation (29)}$$

$$\frac{1}{1-P_{out}^{SR}}\frac{Bn}{\rho_{SR}}\sum_{i=0}^{M-1}(-1)^i\binom{n-1}{i}\psi_1\left(\frac{\rho_{SR}}{i+1}, \frac{B}{t_{out}}\right)$$

Finally, the end-to-end time and throughput can be calculated by substituting the above results in Equation (4) and Equation (19), respectively.

Simulations were performed using the above techniques (using $10^7$ messages). The simulations assume a system bandwidth of 1 MHz, 4096 bits per message, an S-R link SNR of $P_{SR}$=10 dB, and $t_{out}$=10 msec. A number of relays is M=3, unless mentioned otherwise. In the following figures, lines are used to plot analytical results and markers plot simulation results.

Figure 6:
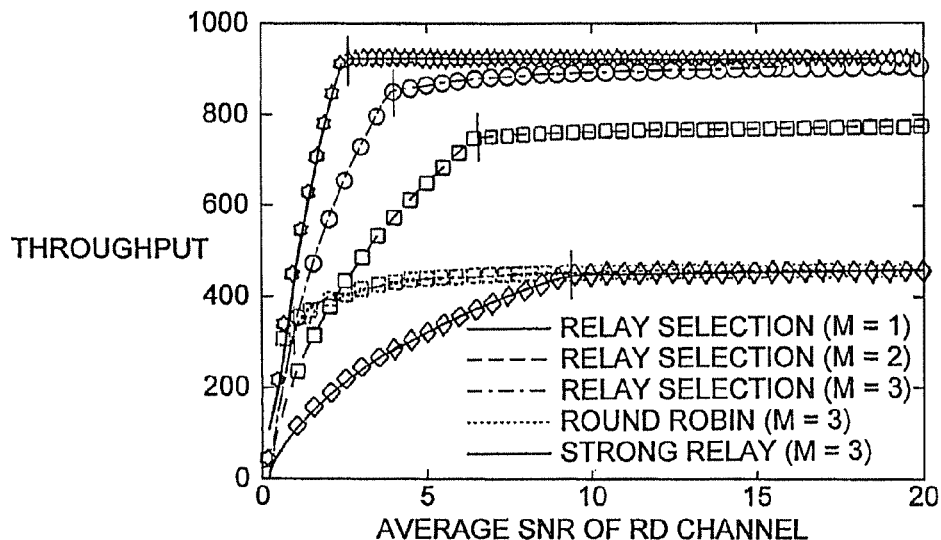
FIG. 6 is a graph illustrating example simulations results that show throughput and stability region for queued relay selection technique as a function of the relay-destination communication link SNR for different numbers of relays.

FIG. 6 is a graph illustrating example simulations results that show throughput and a stability region for the queued relay selection technique as a function of the R-D communication link SNR for different numbers of relays. Both the throughput and stability region increase as the number of relays increases and as the R-D communication link SNR improves. For example, relay selection is stable for $P_{RD} \geq 9.4$ for M=1 and for $P_{RD} \geq 4.0$ for M=3. For comparison sake, the stability regions of the traditional schemes and strong relay link cases are also shown for M=3. Since the traditional schemes load the relays less, their stability region is larger ($P_{RD} \geq 1.0$), while the strong relay link case is stable only for $P_{RD} \geq 2.6$. While the throughput is greater for an unstable system (since the relay destination channel becomes the bottleneck), the delays become unbounded, which is not a desirable operating point for the system.

Figure 7:
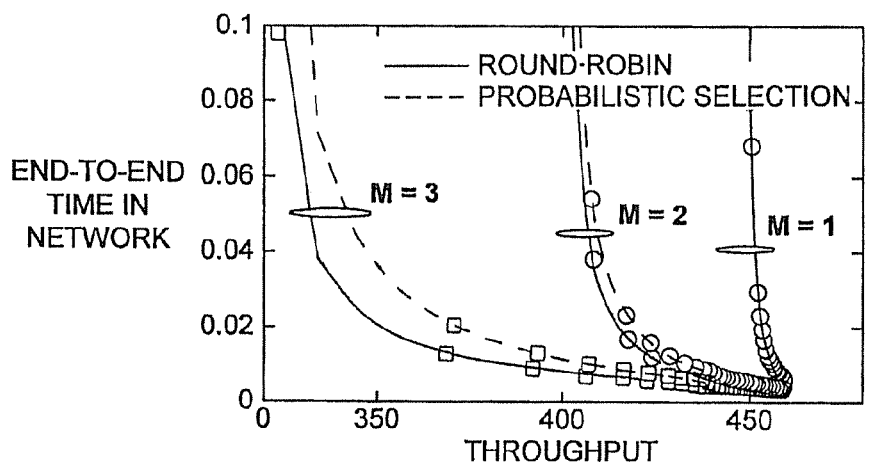
FIG. 7 is a graph illustrating example simulation results that show end-to-end transmission time for queued relay networks.

Increasing the number of relays is beneficial not only because spatial diversity increases which speeds up the transmission times, but also the load on each relay's queue is reduced which decreases queuing delays. FIG. 7 is a graph illustrating example simulation results that show the end-to-end time for the traditional queued relay networks. As M increases, the load at the relay queues decreases since the S-R communication link throughput does not increase.

Figure 8:
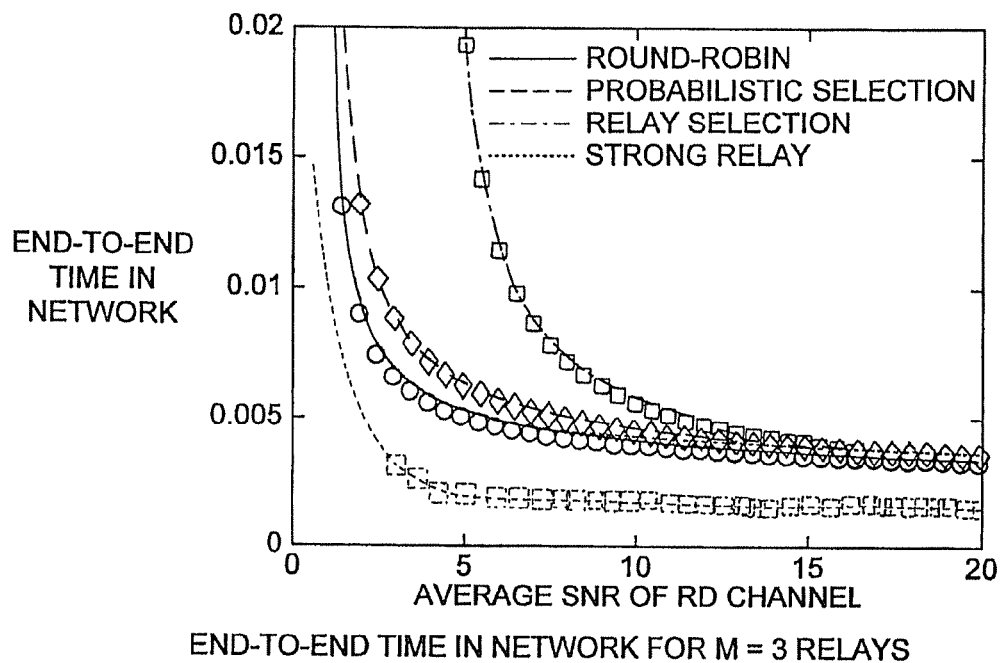
FIG. 8 is a graph illustrating example simulation results that show end-to-end transmission time for queued relay networks as a function of the relay-destination communication link SNR.

The end-to-end time for the various techniques is compared and an example graph illustrating simulation results is shown in FIG. 8 as a function of the R-D communication link SNR, $P_{RD}$. For the same $P_{RD}$, relay selection has the highest end-to-end time followed by probabilistic selection and round-robin. This is because of the higher S-R communication link throughput achieved by relay selection, which consequently loads the relay queues more frequently compared to the traditional models. Notice also that the end-to-end delay of the round-robin scheme is always less than that for probabilistic selection. This is because the variability of the message arrival times at a relay's queue is lower for round-robin. The strong inter-relay case delivers the lowest end-to-end time. Again, the simulation and analytical results match well for all schemes.

Figure 9:
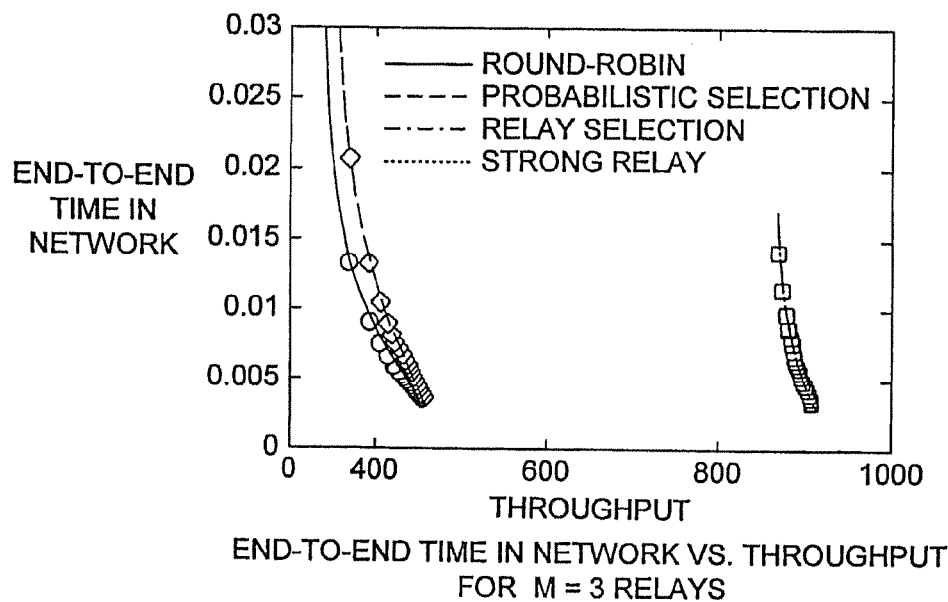
FIG. 9 is a graph illustrating example simulation results that compare throughputs for end-to-end transmission times.

A comparison of the various schemes can also be achieved by comparing throughputs for the same end-to-end time, as is illustrated in the example graph shown in FIG. 9. Relay selection, which exploits spatial diversity, achieves a much higher throughput than the traditional schemes for the same end-to-end delay.

Embodiments above describe how rateless codes can be used to transmit information through a two-hop cooperative wireless network, in which relays have queues and wireless links between them undergo Rayleigh fading. Relay cooperation reduces not only transmission times (by exploiting spatial diversity), but also end-to-end transit times (by providing load balancing). While traditional queued relaying models of probabilistic selection and round-robin exploit the latter aspect, relay selection exploits both aspects. However, in certain situations relay selection may have a smaller stability region than traditional techniques. The strong inter-relay link scenario, in which strong inter-relay links enable all the relays to cooperate in transmitting messages to the destination, also performs well as compared to traditional techniques. This is because all the relays help in servicing every packet in the network, which is not the case with relay selection or the traditional schemes.

The source and destination shown in FIG. 1A and described throughout the application may be any device in a network that transmits and receives messages. In a wireless communication network, for example, the source may be a base station and the destination may be another base station or a mobile station. The intermediate relays may be base stations or simply repeaters. Each of the source, destination and relays may operate according to any known wireless communication protocol, such as time'-division multiple access (TDMA) or code-division multiple access (CDMA), for example. Thus, a communication between a source and a relay, and between a relay and a destination may be a wireless communication channel. The source, destination and relays may include processors and data storage for storing program code that is executed by the processors to perform functions of the present application.

Figure 10:
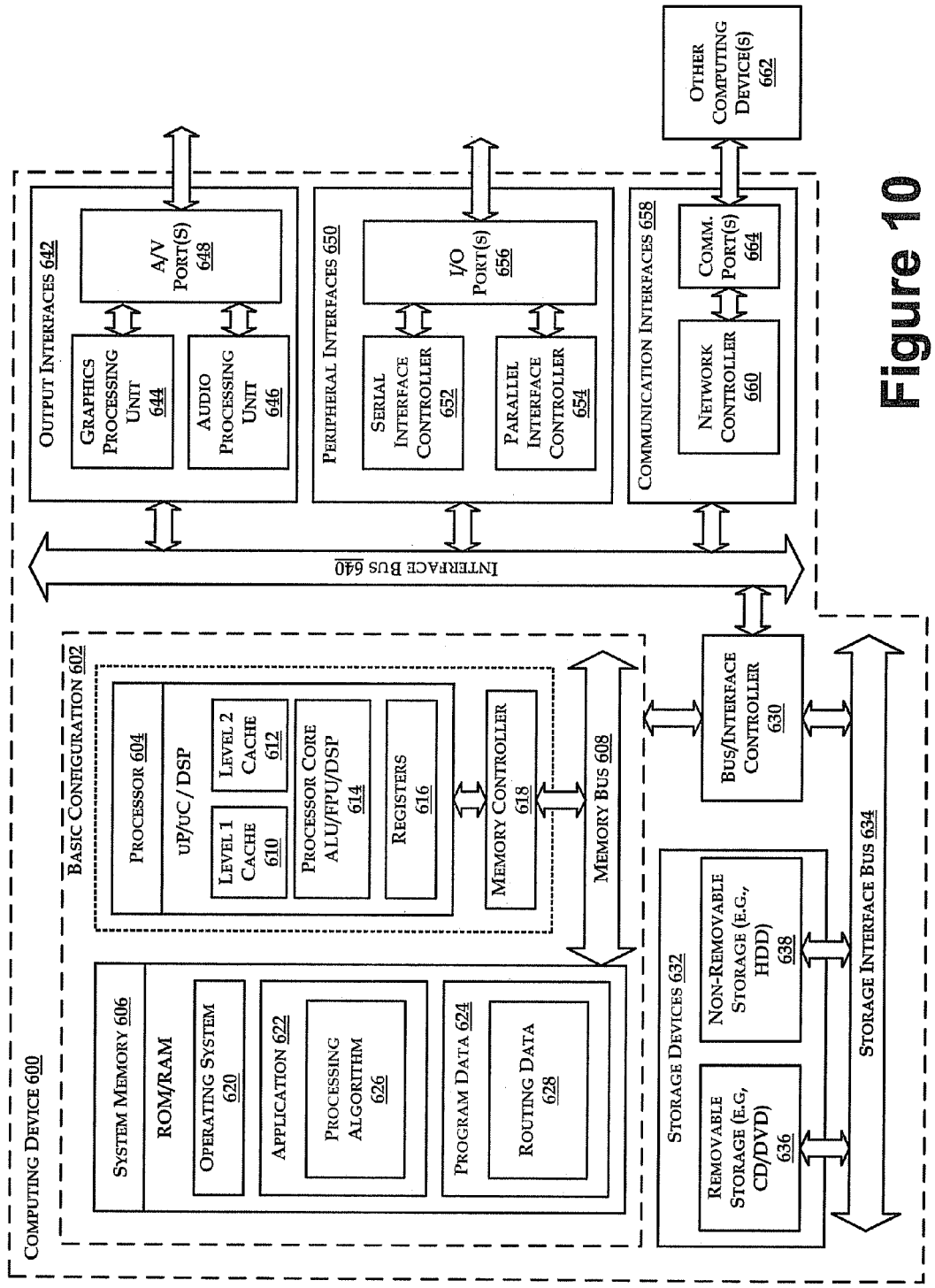
FIG. 10 is a block diagram illustrating an example computing device that may be arranged as any of the source, the destination, or the relays as shown in FIG. 1A.

FIG. 10 is a block diagram illustrating an example computing device 600 that may be arranged as any of the source, the destination, or the relays as shown in FIG. 1A. In a basic configuration 602, the computing device 600 typically includes one or more processors 604 and system memory 606. A memory bus 608 can be used for communicating between the processor 604 and the system memory 606.

Depending on a desired configuration, the processor 604 can be of any type including but not limited to a microprocessor (µP), a microcontroller (µC), a digital signal processor (DSP), or any combination thereof. The processor 604 can include one more levels of caching, such as a level one cache 610 and a level two cache 612, a processor core 614, and registers 616. The processor core 614 can include an arithmetic logic unit (ALU), a floating point unit (FPU), a digital signal processing core (DSP Core), or any combination thereof. A memory controller 618 can also be used with the processor 604, or in some implementations the memory controller 618 can be an internal part of the processor 604, for example.

Depending on a desired configuration, the system memory 606 can be of any type including but not limited to volatile memory (such as RAM), non-volatile memory (such as ROM, flash memory, etc.) or any combination thereof. The system memory 606 typically includes an operating system 620, one or more applications 622, and program data 624. The application 622 includes, for example, a processing algorithm 626 that is executable to perform any of the methods shown in FIG. 3, 4, or 5 depending on an application of the computing device 600. The program data 624 includes routing data 628 that is useful for indicating routing of messages in a network, for example. In some example embodiments, the application 622 can be arranged to operate with the program data 624 on the operating system 620 such that messages are transmitted and received by selected relays, for example. This described basic configuration 602 is illustrated in FIG. 6 by those components within dashed line 602.

The computing device 600 can have additional features or functionality, and additional interfaces to facilitate communications between the basic configuration 602 and any required devices and interfaces. For example, a bus/interface controller 630 can be used to facilitate communications between the basic configuration 602 and one or more data storage devices 632 via a storage interface bus 634. The data storage devices 632 can be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

The system memory 606, removable storage 636 and non-removable storage 638 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 600. Any such computer storage media can be part of the computing device 600.

The computing device 600 can also include an interface bus 640 for facilitating communication from various interface devices (e.g., output interfaces, peripheral interfaces, and communication interfaces) to the basic configuration 602 via the bus/interface controller 630. Example output interfaces 642 include a graphics processing unit 644 and an audio processing unit 646, which can be configured to communicate to various external devices such as a display or speakers via one or more audio/visual (A/V) ports 648. Example peripheral interfaces 650 include a serial interface controller 652 or a parallel interface controller 654, which can be configured to communicate with external devices such as input devices (e.g., keyboard, mouse, pen, voice input device, touch input device, etc.) or other peripheral devices (e.g., printer, scanner, etc.) via one or more input/output (I/O) ports 656. An example communication interface 658 includes a network controller 660, which can be arranged to facilitate communications with one or more other computing devices 662 over a network communication via one or more communication ports 664. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

The computing device 600 can be implemented as a portion of a small-form factor portable (or mobile) electronic device.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method of transmitting information between a source and a destination using an intermediate relay, the method comprising:

a plurality of intermediate relays receiving from the source via a first communication channel blocks of a given message encoded using a first rateless code;

each intermediate relay buffering received blocks of the given message in the intermediate relay for storage and subsequent delivery to the destination;

upon a first intermediate relay determining that enough blocks of the given message have been received to decode the given message, the first intermediate relay directly transmitting an acknowledgement message indicating to the source to discontinue transmission of the blocks of the given message and directly indicating to other intermediate relays that the first intermediate relay has completed reception of the given message, and placing the given message into a queue of the first intermediate relay;

the first intermediate relay repeatedly transmitting blocks of the given message stored in the queue of the first intermediate relay encoded using a second rateless code to the destination via a second communication channel until an acknowledgment is received from the destination indicating that the destination has received enough blocks to decode the given message; and prior to receiving the acknowledgment from the destination, the plurality of intermediate relays receiving from the source via the first communication channel blocks of a subsequent message encoded using the first rateless code.

2. The method of claim 1, further comprising each intermediate relay repeatedly transmitting blocks of a message stored in a queue of the intermediate relay and encoded using the second rateless code to the destination via the second communication channel until an acknowledgment is received from the destination indicating that the destination has received enough blocks to decode the message stored in the queue.

3. The method of claim 2, wherein the plurality of intermediate relays receive messages via the first communication channel faster than the plurality of intermediate relays complete transmission of the messages to the destination via the second communication channel, and
the method further comprises buffering the messages in the queue in the plurality of intermediate relays for delivery to the destination in a first in first out manner.

4. The method of claim 1, wherein the plurality of intermediate relays receive from the source via the first communication channel blocks of the given message for a predetermined amount of time, and if the predetermined amount of time expires prior to an intermediate relay determining that enough blocks of the given message have been received to decode the given message, and
the method further comprises the plurality of intermediate relays receiving a retransmission of the blocks of the given message.

5. The method of claim 1, wherein the first intermediate relay determining that enough blocks of the given message have been received to decode the given message comprises the first intermediate relay recovering the given message by solving a linear set of equations using the received blocks and a function of the first rateless code.

6. The method of claim 1, further comprising each intermediate relay transmitting messages within queues of the intermediate relays encoded using the second rateless code to the destination in an order received at the intermediate relays.

7. The method of claim 1, further comprising the plurality of intermediate relays receiving the blocks of the given message stored in the queue of the first intermediate relay encoded using the second rateless code.

8. The method of claim 7, further comprising each intermediate relay repeatedly transmitting blocks of the given message received from the first intermediate relay and encoded using the second rateless code to the destination via the second communication channel until the acknowledgment is received from the destination indicating that the destination has received enough blocks to decode the given message.

9. The method of claim 1, further comprising an intermediate relay emptying a respective buffer that includes buffered received blocks of the given message if the intermediate relay has not received enough blocks of the given message to be able to successfully decode the given message within a timeout period.

10. The method of claim 1, further comprising:
intermediate relays receiving the acknowledgement message transmitted by the first intermediate relay; and
the intermediate relays emptying a buffer including the buffered received blocks of the given message.

11. The method of claim 1, wherein the first communication channel and the second communication channel are wireless communication channels.

12. A non-transitory computer-readable medium containing a set of instructions for causing a processing unit to perform the functions of:
receiving from a source via a first communication channel blocks of a given message encoded using a first rateless code;
buffering received blocks of the given message for storage and subsequent delivery to a destination;
determining that enough blocks of the given message have been received to decode the given message;
directly transmitting an acknowledgement message indicating to the source to discontinue transmission of the blocks of the given message and directly indicating to relays to disregard buffered received blocks pertaining to the given message and to empty a buffer including the buffered received blocks of the given message;
placing the given message into a queue for delivery to the destination; and
repeatedly transmitting blocks of the given message stored in the queue encoded using a second rateless code to the destination via a second communication channel until an acknowledgment is received from the destination indicating that the destination has received enough blocks to decode the given message.

13. The non-transitory computer-readable medium of claim 12, wherein the set of instructions are further executable by the processing unit to perform the functions of receiving blocks of a second message transmitted from one of the relays and encoded using the second rateless code.

14. The non-transitory computer-readable medium of claim 13, wherein the set of instructions are further executable by the processing unit to perform the functions of repeatedly transmitting the blocks of the second message encoded using the second rateless code to the destination via the second communication channel until an acknowledgment is received from the destination indicating that the destination has received enough blocks to decode the second message.

15. A relay comprising:
a wireless reception unit for receiving blocks of messages encoded using a first rateless code via a wireless communication channel, and for receiving messages transmitted by other relays;
a rateless decoding unit for receiving the blocks of the messages and decoding the messages;
a queue for storing the blocks of the messages, wherein upon receiving a message directly from another relay indicating that the other relay has decoded a given message prior to the relay, the queue empties a buffer of stored blocks of the given message such that the stored blocks of the given message are disregarded;
a rateless encoding unit to encode received messages using a second rateless code; and
a radio transmission unit for transmitting a message indicating that the relay has decoded the message, and for transmitting blocks of received messages encoded using the second rateless code.

16. The relay of claim 15, wherein the radio transmission unit repeatedly transmits blocks of received messages stored in the queue encoded using the second rateless code to a destination via a second communication channel until an acknowledgment is received from the destination indicating that the destination has received enough blocks to decode the messages stored in the queue.

17. The relay of claim 15, wherein the radio transmission unit repeatedly transmits blocks of received messages stored in the queue encoded using the second rateless code in a first in first out manner.

18. The relay of claim 15, wherein the rateless decoding unit decodes the messages by solving a linear set of equations using the received blocks and a function of the first rateless code.

19. The relay of claim 15, wherein the wireless reception unit receives blocks of messages encoded using rateless codes transmitted by other relays.

20. The relay of claim 19, wherein the radio transmission unit repeatedly transmits blocks of the messages received from the other relays encoded using the rateless codes to the destination until an acknowledgment is received from the destination indicating that the destination has received enough blocks to decode the messages.

21. The relay of claim 15, wherein the queue empties the buffer of stored blocks of the given message if the relay has not received enough blocks of the given message to be able to successfully decode the given message within a time-out period.

* * * * *